Patented Oct. 27, 1942

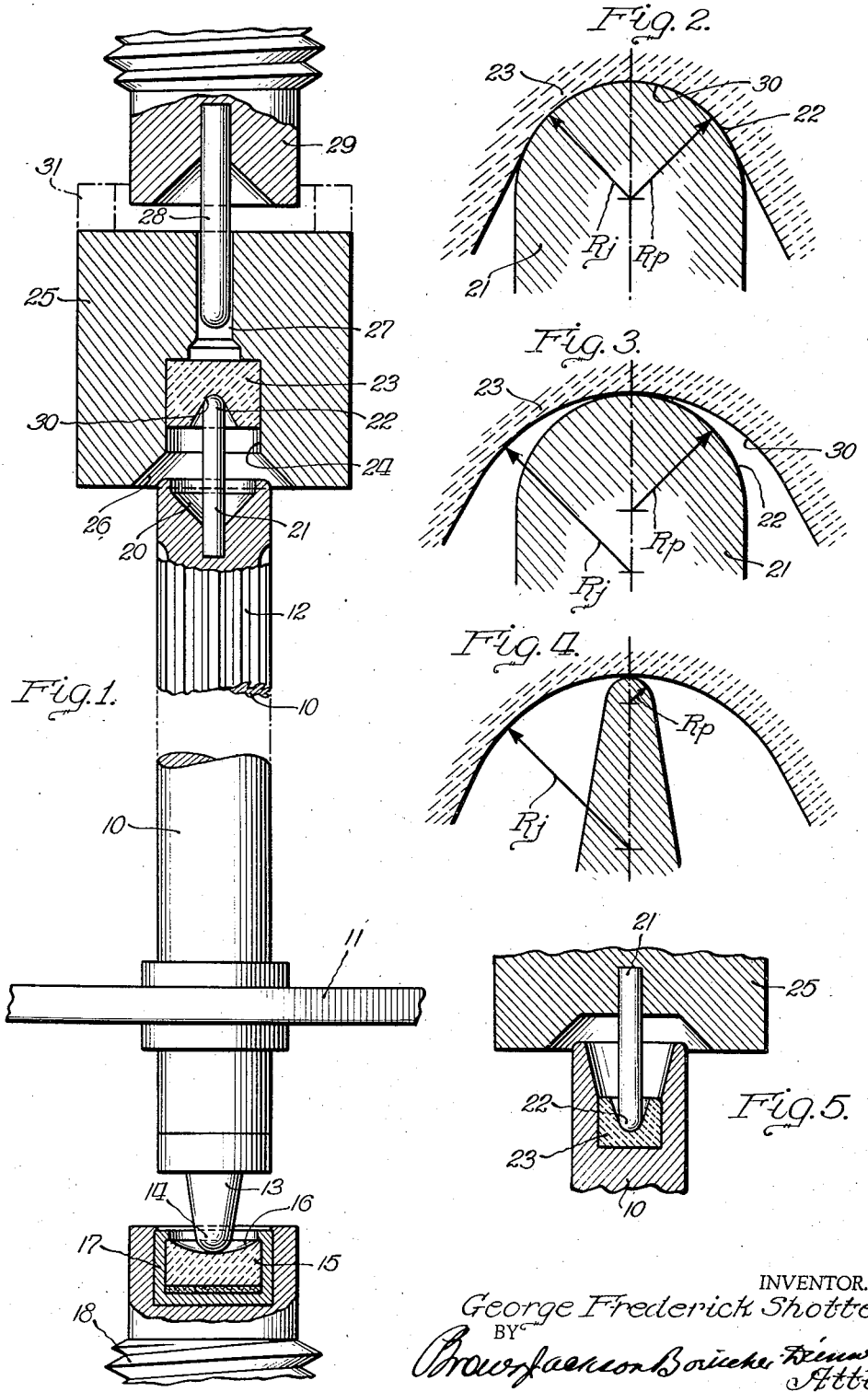

2,300,362

UNITED STATES PATENT OFFICE 2,300,362

BEARING FOR INTEGRATING AND LIKE METERS

George Frederick Shotter, Friern Barnet, London, England

Application October 30, 1940, Serial No. 363,391
In Great Britain November 27, 1939

3 Claims. (Cl. 308—159)

This invention concerns improvements in or relating to bearing arrangements for integrating and like meters such as electric W. H. meters which normally operate by rotation in one direction only. The invention is particularly concerned with an improved upper-bearing construction for mounting the induction-disc rotor of an alternating-current supply meter.

It is already known in connection with motor-type direct-current supply meters to employ a jewelled upper-bearing for the meter rotor. The employment of such a bearing in a D. C. meter is an important feature since the available torque is small and it is, in consequence, absolutely essential to provide a bearing which is as frictionless as possible. In such D. C. meters there is very little, if any, pressure upon the lower-bearing provided for the meter rotor since the latter is almost, if not completely, floated in mercury while furthermore there is very little side thrust exerted upon the spindle of the meter rotor on account of the low driving and braking torques which are developed. The presence of side thrust tends to cause serious increase in the frictional losses of the bearing.

In a particular known construction of upper-bearing for a motor-type D. C. W. H. meter the upper end of the rotor spindle was provided with a comparatively sharp metal point and this engaged a jewel carried by a weighted member of circular section slidably and rotatably mounted in a sleeve above the said pointed end of the rotor spindle. The jewel had a bearing recess whose cross-sectional shape, taken in an axial plane, was that of an inverted-V whose apex was of rounded form having a radius of curvature many times that of the sharpened point end of the rotor spindle which engaged such rounded apex portion of the bearing recess.

In alternating-current electric supply meters it is common to provide a jewelled lower-bearing, usually in the form of a shallow and stationary cup-jewel supporting the ball-shaped lower end of the rotor spindle while the upper-bearing arrangement for such an A. C. meter commonly consists of a small diameter pin passing through a hole formed either in a metal disc or in a jewel of ring formation. The pin may be carried by the rotor spindle and the perforated member by a stationary part of the meter or vice versa. In such A. C. meters the whole of the weight of the rotating parts rests upon the lower-bearing while the pin of the upper-bearing which is free to rotate without undue friction, provided the bearing is oiled, serves to prevent lateral movement of the meter spindle due to the side thrust forces which arise and which in alternating-current meters normally reach values many times in excess of those encountered in D. C. meters on account of the greatly increased driving and braking torques available in such A. C. meters and due to the side thrust due to driving the clock train and associated mechanism, if any. In view of such increased torques the frictional losses which this type of upper-bearing introduces when properly lubricated have hitherto been considered negligible.

It has been found possible, however, to design induction-disc type A. C. meters whereby they may safely be operated at considerable overload (figures of 300–400% are frequently encountered) without serious inaccuracy and in consequence it is becoming common practice to employ such meters under conditions where such overloads frequently occur. At such overloads the frictional losses at the upper-bearing are greatly increased due to intensified side thrust and other causes and call for improved arrangements of such upper-bearing. Furthermore it is becoming increasingly desirable that the meter bearings should operate for long periods of time and use without any attention and preferably without any oiling since the latter necessitates comparatively frequent replenishing and cleaning operations and has furthermore been found to cause difficulties due to congealing of the oil when the meter is used in cold locations.

The object of the present invention is to provide an upper-bearing arrangement which will meet the above requirements.

According to the present invention the bearing support of the upper end of the rotor of an alternating-current electric supply or like meter is effected by the engagement of jewel bearing with a pin under the uniform pressure of a weight which is adapted itself to move freely, the interengaging surfaces of the jewel and the pin being of rounded character and having respective radii of curvature whose ratio one to the other lie between the limits of 1:1 and 1.5:1. The pin element of the bearing is conveniently carried by the rotor spindle and the jewel in a small weight having a central hole of small diameter at its upper end into which a pin enters to permit of both vertical and rotary movement of the weight with the minimum of friction so that the jewel is slidably mounted upon a fixed part of the meter structure, but it will be apparent that the positions may be reversed if desired.

In order that the invention may be more readily understood a constructional embodiment thereof will now be described with reference to the accompanying drawing, in which:

Fig. 1 is a part-sectional elevation to an enlarged scale of the upper and lower ends of the rotor spindle of an alternating-current electric watthour meter showing one embodiment of upper-bearing arrangement according to the invention in association with the form of lower-bearing normally employed in such meters and with which the said upper-bearing is particularly adapted to co-operate.

Figs. 2 and 3 are still further magnified diagrammatic views showing the relative profiles of the interengaging bearing surfaces of an upper-bearing arrangement according to this invention.

Fig. 4 is a view similar to Figs. 2 and 3 but illustrating, by way of comparison, the relative profiles of the known jewelled upper-bearing arrangement employed in D. C. supply meters.

Fig. 5 is a view showing a modification of the upper bearing arrangement.

In the construction shown in Fig. 1 reference numeral 10 designates the rotor spindle carrying its induction disc 11 and provided near its upper end with gear teeth 12 for meshing engagement with a gear-wheel in driving connection with the usual indicating train or other mechanism.

The lower end of the spindle 10 is provided with a hardened steel point 13 having an extremity 14 of well-rounded part-spherical or ball shape. This extremity 14 bears upon a jewel 15 having a shallow cup-shaped bearing surface 16. The jewel is securely mounted in a metal cup 17 itself fixed in the recessed end of a threaded bearing screw 18 which is adapted to enter a tapped hole in a fixed frame part of the meter structure so as to be adjustable as to its position.

The upper end of the spindle is provided with a co-axial recess 20 and projecting axially therefrom is a thin steel pin 21 provided with a rounded or part-spherical surfaced upper extremity 22. This upper extremity engages in the bearing recess of a jewel 23 which is seated within an axially disposed hole 24 in the lower side of a small cylindrical weight 25 formed of metal. The hole 24 containing the jewel 23 terminates in a downward direction in an enlarged region 26, e. g. of chamfered form as shown or other suitable shape, to allow the weight 25 to cover and substantially enclose the upper end of the spindle 10 thereby to afford protection of the bearing between the pin and jewel against outside influences such as dust.

The weight 25 is provided with a further smaller-diameter bore 27 disposed coaxial with respect to the hole 24 and jewel 23 and extending through to the upper surface of the weight. This bore 27 is arranged to receive therein, in a freely fitting and slidable manner but with the minimum of play, a further thin steel pin 28 which is rigidly secured as a co-axial extension of a further threaded bearing-screw 29 which, like the screw 18, is adapted to enter a tapped hole in a fixed part of the meter structure so as to be adjustable as to its position.

With the arrangement described the weight 25 and the jewel 23 carried thereby are free to slide up and down upon the pin 28 and thereby to keep the said jewel in contact with the pin 21 of the spindle under a constant small pressure governed by the size of the weight, irrespective of any axial movement of the spindle. Such axial movement has been found to occur to an appreciable extent in alternating-current W. H. meters on account of the considerable side thrust forces which are encountered particularly under the aforementioned overload conditions. It has been found that under the influence of side thrust the bearing surface at the lower extremity 14 of the point 13 rides up the inclined cup surface of the lower jewel towards its peripheral edge and consequently removes the lower end of the axis of the rotor system from true alignment with the common axis of the upper and lower-bearing mountings. Such inclination clearly tends to aggravate the frictional losses occurring at the upper-bearing when this is of the usual ring-stone or perforated plate form. With the arrangement according to the invention, however, the upper end of the spindle is free to take up whatever inclination of the spindle is called for while the bearing jewel is free to rise to the amount called for by the travel of the point 13 up the surface of the cup-jewel 15. In other words, the moving system comprising the spindle and associated induction disc is capable of floating into such position as may be necessary to counteract the side thrusts imposed thereon and is not constrained towards rotation at all times upon the exact axis chosen for the system.

The relative shaping of the interengaging bearing surfaces of the jewel 23 and the pin 21 is of great importance in view of the side thrust forces which are encountered and the axial displacement of the spindle which takes place. As will be seen from Fig. 1 the bearing recess is of a form whose cross-section, taken in a plane which includes the axis of the bearing system, resembles that of an inverted-V the apex 30 of which is rounded. It is the rounded portion 30 of this bearing recess which is in bearing engagement with the upper and also well-rounded extremity 22 of the pin 21 of the spindle. The precise relationships between the respective curvatures of extremity 22 of pin 21 and bearing recess portion 30 are shown more clearly in Figs. 2 and 3, which illustrate the opposite limits of the range of sizes within which this invention falls. Fig. 2, in which the radius of curvature $R_j$ of the portion 30 of the jewel 23 is shown equal to the radius of curvature $R_p$ of the rounded extremity 22 of the pin 21, offers too great an area of interengaging bearing surfaces to be practicable although if $R_p$ is only slightly less than $R_j$ permitting displacement of the pin 21 from true axial alignment with the axis of the jewel 23 this will give satisfactory results.

It will be appreciated that it is undesirable to make the radius $R_p$ greater than that of the radius $R_j$ since if this is done a ring-shaped area of bearing engagement is provided which causes an increase in the unit pressure between the opposed bearing surfaces and this coupled with the displacement of the bearing area outwardly from the axis of rotation of the rotor causes undesirable frictional losses to be set up.

By making the radius $R_p$ smaller than radius $R_j$ in theory it would appear that a point contact would be set up by such a construction. In practice anything approaching a point contact is not obtained unless there is a large difference between the respective radii of curvature of the pin 21 and jewel surface 30 and it has been found that satisfactory results are obtained with the radius $R_p$ smaller than radius $R_j$ substantially up to the condition where $R_j$ is of the order of 1.5 times that of $R_p$.

The distinction between the relative curvatures of the bearing surfaces upon the pin and jewel within the range according to the present invention and those of the bearing arrangement of the known D. C. meter arrangement is brought out by the comparison of Figs. 2 and 3 with Fig. 4 which shows the profiles of the prior arrangement to a similar scale. As will be seen $R_j$ in this case is many times that of $R_p$ with the consequent attainment of substantially point contact.

The penetration of the pin 28 into the bore 27 of the weight 25 is sufficient to ensure that any variations which occur in the manufacture of the component parts of the shaft and its bearings can be taken up without seriously affecting the efficiency of the bearing both as regards its freedom from friction and its stability. These variations if all acting in the same way, i. e. to decrease the overall length of the meter shaft, might result in the bearing becoming so loose that it would be unsatisfactory and might in fact come apart if the length of the pin in the bearing was inadequate.

In a particular constructional embodiment which has given satisfactory results the jewel 23 was of sapphire and had a bearing surface portion 30 whose radius of curvature was in the order of .0113". The pin 21 in this case was of steel with a hardened polished surface 22 whose radius of curvature was in the order of .0095". The weight 25 in such case comprised a small cylindrical brass member of rather under a quarter of an inch in diameter and rather under a quarter of an inch in length and had a weight of between 1 and 2 grammes while the diameter of the pin 28 was .0328" and the diameter of the hole in which it engaged was .0333."

It will be understood that the above-described embodiment is but one example of the carrying of the invention into effect and that considerable modifications can be made in the constructional details without departing from the spirit of the invention. For instance, it is not essential that the jewel 23 should be located in the weight 25 and the pin 21 in the meter spindle 10; these could readily be reversed as shown in Fig. 5. Similarly it is not essential that the bore 27 co-operating with the further pin 28 should be in the upper end of the weight and the pin in the adjustable bearing screw 29; these could also be reversed.

As a further modification the upper part of the weight 25 might also be extended or recessed as shown in chain dotted lines at 31 (Fig. 1) so that the end of the adjustable bearing screw is embraced by the weight and so affords protection for the slidable bearing between the pin 28 in said adjusting member and the small upper bore 27 in the weight.

I claim:

1. In an electric meter or the like having an upper bearing construction and lower bearing means for rotatably supporting a spindle, the lower bearing means being of a character permitting the spindle to deviate from its normal axis of rotation upon lateral thrust being imposed on the spindle, said upper bearing construction comprising a first pair of bearing elements in substantial axial alignment with the axis of rotation of said spindle, one of the elements comprising a bearing jewel having a concave part-spherical bearing surface, and the other element comprising a bearing pin having a convex part-spherical bearing surface at one end thereof, a weight for maintaining the bearing surface of the pin in engagement with the bearing surface of the jewel, the radius of curvature of the jewel bearing surface being slightly greater but substantially not more than one and one-half times the radius of the curvature of the bearing surface of the pin, one of said elements being carried by said weight and the other of said elements being fixed to the spindle, a third bearing means coaxial of the normal axis of rotation of said spindle and disposed between said weight and a stationary portion of the meter, said third bearing means comprising a pair of bearing elements of a character permitting the weight to move freely substantially along the axis of rotation of the spindle, said third bearing means comprising a pintle and there being a bore for the pintle and defining the other bearing element, one of the elements of said last bearing means being associated with said weight, and the other bearing element thereof being associated with the stationary portion of the meter.

2. A bearing arrangement for the upper end of a rotor spindle of an alternating current supply or like meter liable to be subjected to considerable lateral thrust comprising, a fixed bearing structure, a pin depending from said fixed bearing structure, a weight slidably guided for vertical movement by said pin, a bearing jewel carried by said weight and having a bearing recess provided with a substantially part-spherical bearing surface, and a steel pin projecting upwardly from said rotor spindle and provided with a substantially part-spherical-shaped bearing surface at its upper end for engagement with said bearing surface of said jewel under the pressure of said weight, the radius of curvature of the jewel bearing surface being substantially equal to or not more than 1.5 times the radius of curvature of the bearing surface of said steel pin.

3. A bearing arrangement for the upper end of a rotor spindle of an alternating current supply or like meter liable to be subjected to considerable lateral thrust comprising, a fixed bearing structure, a pin depending from said fixed bearing structure, a weight slidably guided for vertical movement by said pin, a steel pin depending from said weight and provided with a substantially part-spherical-shaped bearing surface at its lower end, a bearing jewel carried by the upper end of said rotor spindle and having a bearing recess provided with a substantially part-spherical bearing surface for engagement with said bearing surface of said steel pin under the pressure of said weight, the radius of curvature of the jewel bearing surface being substantially equal to or not more than 1.5 times the radius of curvature of the bearing surface of said steel pin.

GEORGE FREDERICK SHOTTER.